United States Patent [19]

Thompson

[11] Patent Number: 5,386,463

[45] Date of Patent: Jan. 31, 1995

[54] LOW NOISE MULTI-ELEVATOR COMMUNICATION SYSTEM AND METHOD

[75] Inventor: James H. Thompson, Dallas, Tex.

[73] Assignee: Kings III of America, Inc., North America, Carrollton, Tex.

[21] Appl. No.: 977,877

[22] Filed: Nov. 17, 1992

[51] Int. Cl.⁶ .................... H04M 1/00; H04M 13/00
[52] U.S. Cl. ............................. 379/182; 379/183; 379/37; 379/40
[58] Field of Search ................ 379/40, 41, 42, 43, 379/44, 181, 182, 183, 184, 161, 160, 37

[56] References Cited

U.S. PATENT DOCUMENTS

| | | |
|---|---|---|
| 914,468 | 3/1909 | Wagner et al. |
| 972,329 | 10/1910 | Bruce |
| 1,000,488 | 8/1911 | Bruce |
| 1,040,636 | 10/1912 | Bals |
| 1,185,086 | 5/1916 | Goodrum |
| 1,185,087 | 5/1916 | Goodrum |
| 1,463,972 | 8/1923 | Powell |
| 1,838,586 | 12/1931 | Winfield-Smith |
| 2,041,879 | 5/1936 | Ulrich |
| 2,062,822 | 12/1936 | Powell |
| 2,070,866 | 2/1937 | Saunders |
| 2,129,345 | 9/1938 | Cover |
| 2,170,391 | 8/1939 | Ruth |
| 2,179,652 | 11/1939 | Waite |
| 2,448,428 | 8/1948 | Graybill |
| 2,543,062 | 2/1951 | Ringkjob et al. |
| 2,884,490 | 4/1959 | Trachsel |
| 2,887,535 | 5/1959 | Craddock |
| 3,005,052 | 10/1961 | Powers |
| 3,673,330 | 6/1972 | Suntop et al. |
| 4,040,013 | 8/1977 | Carlson |
| 4,149,040 | 4/1979 | Atkinson |
| 4,249,036 | 2/1981 | Kutzki |
| 4,645,877 | 2/1987 | Curtin ........................ 379/183 |
| 4,805,210 | 2/1989 | Griffith, Jr. ................ 379/184 X |
| 4,899,372 | 2/1990 | Wahi et al. ................. 379/184 |
| 4,985,916 | 1/1991 | Tachuk et al. .............. 379/184 X |
| 5,056,132 | 10/1991 | Coleman et al. ........... 379/184 X |
| 5,086,450 | 2/1992 | Kitagawa et al. ........... 379/40 |
| 5,173,932 | 12/1992 | Johansson et al. ......... 379/40 |

Primary Examiner—Stephen Chin
Assistant Examiner—Paul Loomis
Attorney, Agent, or Firm—Baker & Botts

[57] ABSTRACT

A system is provided for connecting multiple elevator (700-703) speaker/microphone pairs (114a-114d) to a remote terminal (750) via a standard telephone channel (50). The system comprises generating means (116) for generating an in-use signal from within one of the elevators indicating the use of the speaker/microphone pair in the elevator. The system also includes a dialing means (100a-100d) responsive to the generating means for dialing a number associated with the remote terminal on the standard telephone channel so as to contact the remote terminal. The system further includes first isolating means (200a-200d) for isolating all remaining speaker/microphone pairs from the standard telephone channel, and first connecting means (200a-200d) for connecting the in-use speaker/microphone pair to the standard telephone channel so as to connect the in-use speaker/microphone pair to the remote terminal.

39 Claims, 6 Drawing Sheets

LOW NOISE MULTI-ELEVATOR COMMUNICATION SYSTEM AND METHOD

BACKGROUND OF THE INVENTION

This invention relates generally to low-utilization communication systems; for example, according to one embodiment, an emergency telephone in an elevator is connected to a remote station with a minimization of noise and with a reduction in the number of dedicated telephone lines needed for multiple telephones.

One of the problems associated with elevator telephones is that the telephone cable for the elevator telephone is included in the "trailing cable," which follows the elevator. That trailing cable telephone line acts as an antenna, picking up noise from a variety of sources, including switch gear for the elevator, motors for the elevator, elevator lighting, etc.

One prior art attempt at a solution to this noise problem comprises dedicating individual telephone lines to each elevator telephone, such that each elevator telephone is connected to an exterior telephone company telephone line. Such a solution is very expensive and economically inefficient because of low utilization and because of telephone company line charges. Therefore, there is a need to solve the noise problem without the use of dedicated phone lines.

To address this need, some systems use one individual telephone line which is connected in parallel to each of the elevators in a building. With this parallel connection, it has been found that the induced noise on each elevator cable is also coupled to all other elevator phone cables as well, resulting in a summation of the noise on any individual line being equal to the total amount on all telephone line cables.

There have also been attempts to connect the telephones of each elevator to an existing telephone line that is normally used for communication by tenants in the building where the elevators are located. The idea of this approach is that the normal business line of a tenant can handle the slight increase in usage caused by elevator calls. However, such a system results in the business telephone line being plagued by hum, pops, line "sing." etc., while elevators are running, due to the induced cable noise from the elevator control switching, lighting, motor starting and stopping, etc.

Therefore, there is also a need to provide an elevator telephone system that applies multiple elevator telephones to a single telephone line, and which reduces the noise generated on the elevator phones and the outside telephone line.

SUMMARY OF THE INVENTION

According to one embodiment of the present invention, the above problems are addressed by a system in which each elevator telephone line is routed to a central location, away from the elevators, but no elevator telephone line is connected to any external telephone line until a user within the elevator attempts to use the telephone. Until that instant, all the elevator telephones are inoperable, being disconnected from each other and from any outside line, and thus no elevator imparts any noise to any external (normal) phone line. When the user attempts to make a call from an inoperative elevator, the elevator telephone handset is switched to an outside telephone line; however, none of the other elevator telephones are switched to the outside telephone line. Thus, the noise from the multiple operating elevators is not imparted to the line of the inoperable elevator or the outside telephone line.

Also provided as an embodiment of this invention is an automatic dialer system (here after, an auto-dialer), which is activated upon the receipt of a signal from the elevator handset (for example, caused by depression of the handset user switch in the elevator). Such auto-dialers are known to those of skill in the art.

Also provided by an embodiment of the invention is a repetitive voice audio which is projected from the handset loudspeaker by the user which tells the user that a call is being placed to the remote station. This occurs while the auto-dialer circuit is placing a call to a remote station. Upon connection with the remote station, an identification code, which identifies the particular telephone being used, is provided to the remote station. The remote station then uses the identification code to determine an address for the elevator telephone. After receipt of the identification code, the remote station sends the auto-dialer an acknowledgement signal, and the auto-dialer circuitry then connects the telephone in the elevator with the outside telephone line to the remote station to enable voice communication between the remote station and the elevator telephone.

According to a specific embodiment of the invention, there is provided a multiple elevator telecommunication system for use with a single outside telephone line comprising: a first speaker and microphone pair, located in a first elevator, the first elevator switch having two states, and a first pair of signal lines. The first pair of signal lines being connected to the first speaker and microphone through the trailing cable to the first elevator. There is also provided a second speaker and microphone pair, located in a second elevator, a second elevator switch having two states, and a second pair of signal lines. The second pair of signal lines is connected to the second speaker and microphone pair and included in the trailing cable for the second elevator. There is also provided a first connecting means for connecting the first pair of signal lines to the single telephone line, wherein the first connecting means changes state in response to a use signal from the first elevator switch. The first connecting means is located outside of the first elevator. There is also provided a second means for connecting the second pair of signal lines to the outside telephone line, the second means for connecting being responsive to the second elevator switch changing state and also located outside of the first elevator.

Also provided according to an embodiment of the invention is a process for connecting multiple elevator speaker/microphone pairs to a remote terminal via a standard telephone channel (herein, telephone channel includes "tip and ring" cables, as well as radio, telephone and cellular telephone channels), comprising:

generating a use signal from within one of the elevators;

dialing a telephone number corresponding to a number for the remote terminal on the standard telephone channel (herein, dialing refers to all methods of sending a coded number into a telephone channel, including pulse and touch tone coding), wherein said connecting is done in response to said generating of the use signal;

isolating the speaker/microphone pairs of all other of the multiple elevator speaker/microphone pairs from the standard telephone channel; and connecting the speaker/microphone pair of the one elevator to the standard telephone channel after said dialing.

The above summary is given by way of example only and is not intended as a limitation of the fair scope of the invention.

BRIEF DESCRIPTION OF THE DRAWINGS

For a more complete understanding of the present invention and for further advantages thereof, reference is made to the following description of example embodiments of the invention, taken in connection with the accompanying drawings, in which.

It is to be noted, however, that the appended drawings illustrate only typical embodiments of this invention and are therefore not to be considered limiting of the invention.

DESCRIPTION OF AN EXAMPLE EMBODIMENT OF THE INVENTION

Figure 1:
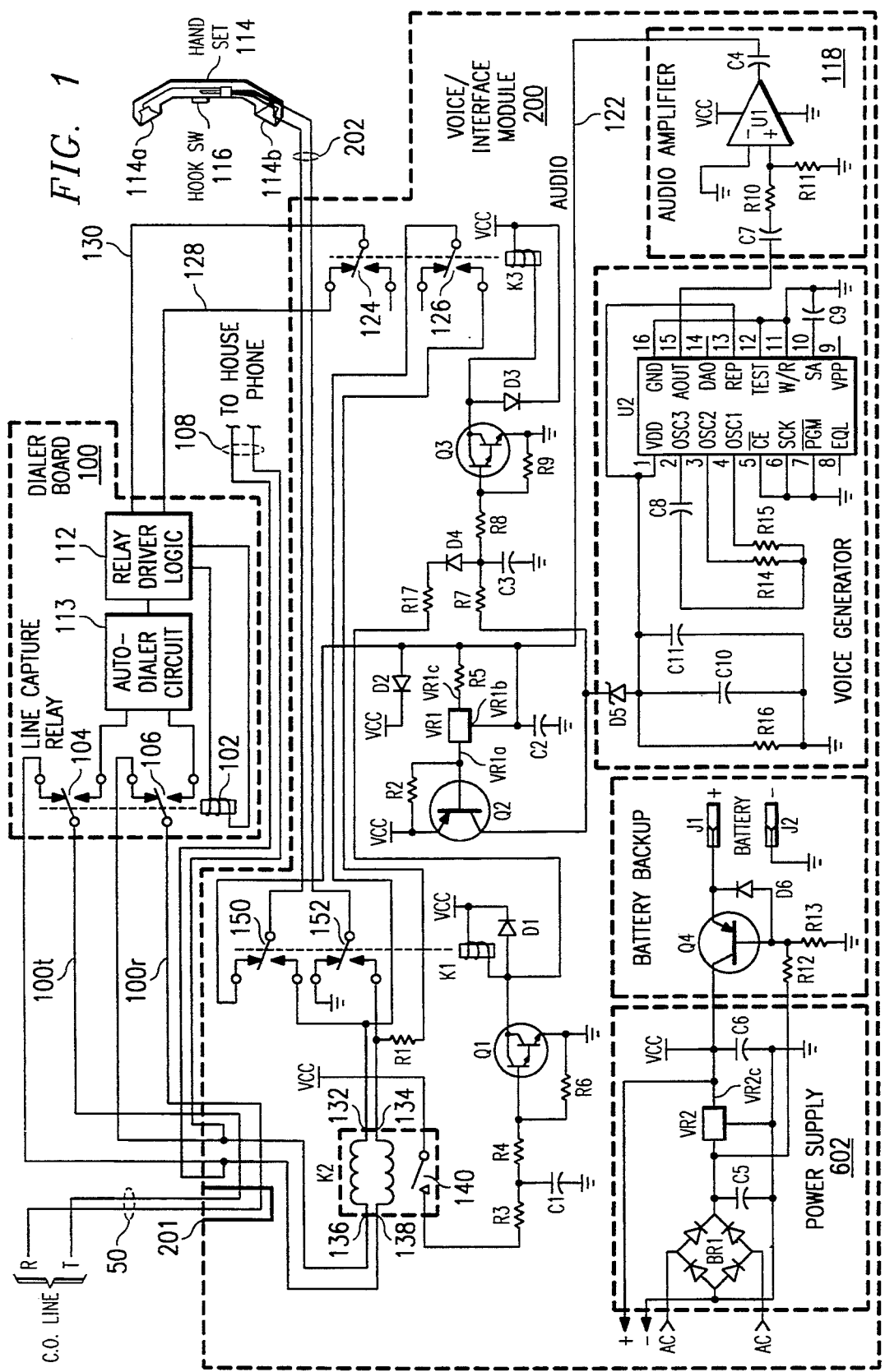
FIG. 1 is a schematic of a circuit used in conjunction with an embodiment of the invention showing an "idle" mode state of the circuit.

FIG. 1 shows a schematic of various circuits used according to one embodiment of the present invention, in which the tip and ring conductors of a typical outside telephone company service line 50 are connected to telephone line input 201 of voice/interface module 200, which is connected, in turn to conductors 100t and 100r of dialer board 100 (an off-the shelf component; for example, the unit made by the Acron Corp. of Lakewood, N.J., USA, Model DD-1). Dialer board 100 includes a line capture relay comprised of solenoid 102 and switches 104 and 106. Also, as shown, switches 104 and 106 are connected to the house phone line 108, which, in turn, is connected to a telephone (not shown) used in a normal day-to-day manner or to another similar circuit for use on another elevator (as demonstrated in FIG. 6). Switches 104 and 106 are also connected to auto-dialer circuit 113 of dialer board 100, such that incoming telephone line 50 is alternately switched between either house phone line 108 and the voice/interface module, or auto-dialer circuit 113. depending upon the position of switches 104 and 106 (which are responsive to relay driver logic 112).

FIG. 1 shows the example embodiment in the "idle mode," in which the outside telephone line 50 is connected to house phone line 108 (the connection to the voice/interface module results in an "open" connection within the module). As shown in FIG. 1, telephone handset 114 includes a speaker 114a and a microphone 114b, and handset 114 is located inside of an elevator (not shown). In the idle mode, handset 114 is disconnected, due to the open circuit position of hook-switch 116, which prevents current from flowing through resistor R2 and voltage regulator VR1 (for example, an LM317TB), as described in the description of FIG. 2.

With no current flow through voltage regulator VR1, PNP transistor Q2 (for example, a 2N5401) is in a nonconducting state, and thus voice generator chip U2 (for example, an MSM6378A), whose power is supplied from the collector of transistor Q2, is inoperative. Therefore, no audio signal is transmitted from audio amplifier 118 (for example, an LM386) through switch contacts 150 of relay K1 to speaker 114a of handset 114.

Figure 2:
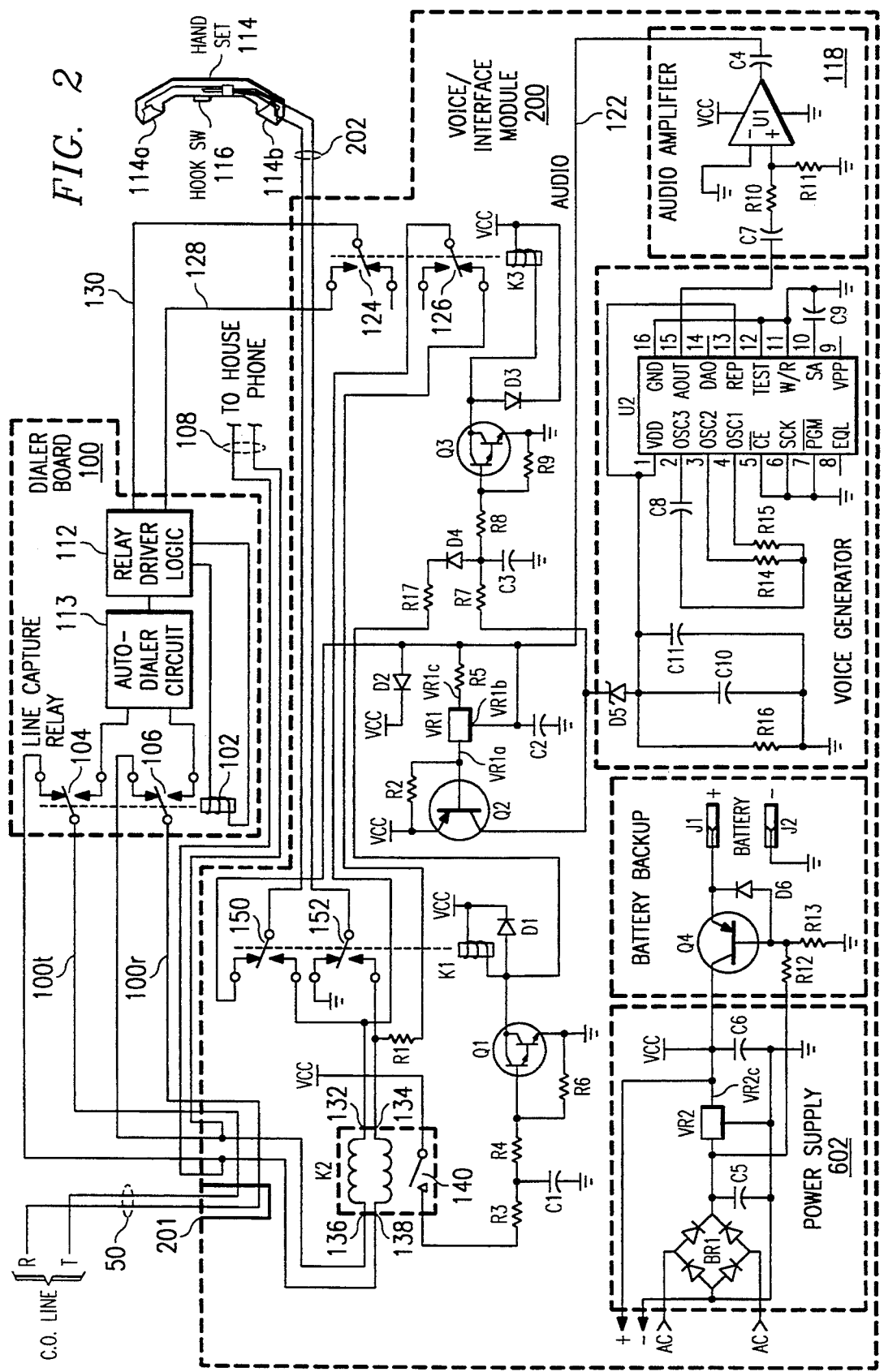
FIG. 2 is a schematic of the circuit shown in FIG. 1, in an open "off-hook" state.

Referring now to FIG. 2, a portion of the example embodiment's reaction to closure of user switch 116 is described. It should be noted that before closure of switch 116, transistor Q2 is off, because terminal VR1b of voltage regulator VR1 is held high by capacitor C2. Closure of switch 116 connects a current path as follows: from VCC through resister R2, into input terminal VR1a of voltage regulator VR1, from terminal VR1b through switch 150 of relay K1, through handset 114, through switch 152 of relay K1, and to ground. This current path shorts capacitor C2 to ground, thus turning on transistor Q2. Current flowing through resistor R5 sets the current limit of voltage regulator VR1, and diode D2 prevents output terminal VR1c of voltage regulator VR1 from going more positive than terminal VR1b.

Turning on transistor Q2 provides power for voice generator chip U2 (for example, an MSM6378A), through zener diode D5 (for example a 1N5235), to provide a minimum acceptable operating voltage (5v D.C.) to the voice generator chip U2. Turning on tranistor Q2 also turns on transistor Q3 (for example, a Darlington MPSA13). The base of transistor Q3 is connected to the collector of transistor Q2 through resistors R7 and R8. With Q3 conducting, current flows through relay K3 and through transistor Q3 to ground, thus causing switches 124 and 126 of relay K3 to change state. Resistor R9 is connected between the base of transistor Q3 and the emitter of transistor Q3 for biasing as is understood by those of skill in the art. Diode D3 (for example, a 1N4005) is connected in parallel with relay K3 for transient voltage spike protection.

The audio output from terminal (AOUT) of voice generator chip U2, is amplified by audio amplifier 118 (for example a LM386) whose output 122 is connected through switch 150 of relay K1, then to one terminal of handset speaker 114a. The other terminal of handset speaker 114a is connected through switch 152 to ground, as shown in FIG. 2, thus providing the audio circuit for handset speaker 114.

The audio heard at handset 114a lets the user know that use of the system is acknowledged and that dialing to the remote station (not shown) has begun. Based on one manufacturer's specifications for audio chip U2, power is applied as shown, including to terminal REP of audio chip U2, which causes the preprogrammed message to repeat, until power is disconnected from voice generator chip U2.

Figure 3:
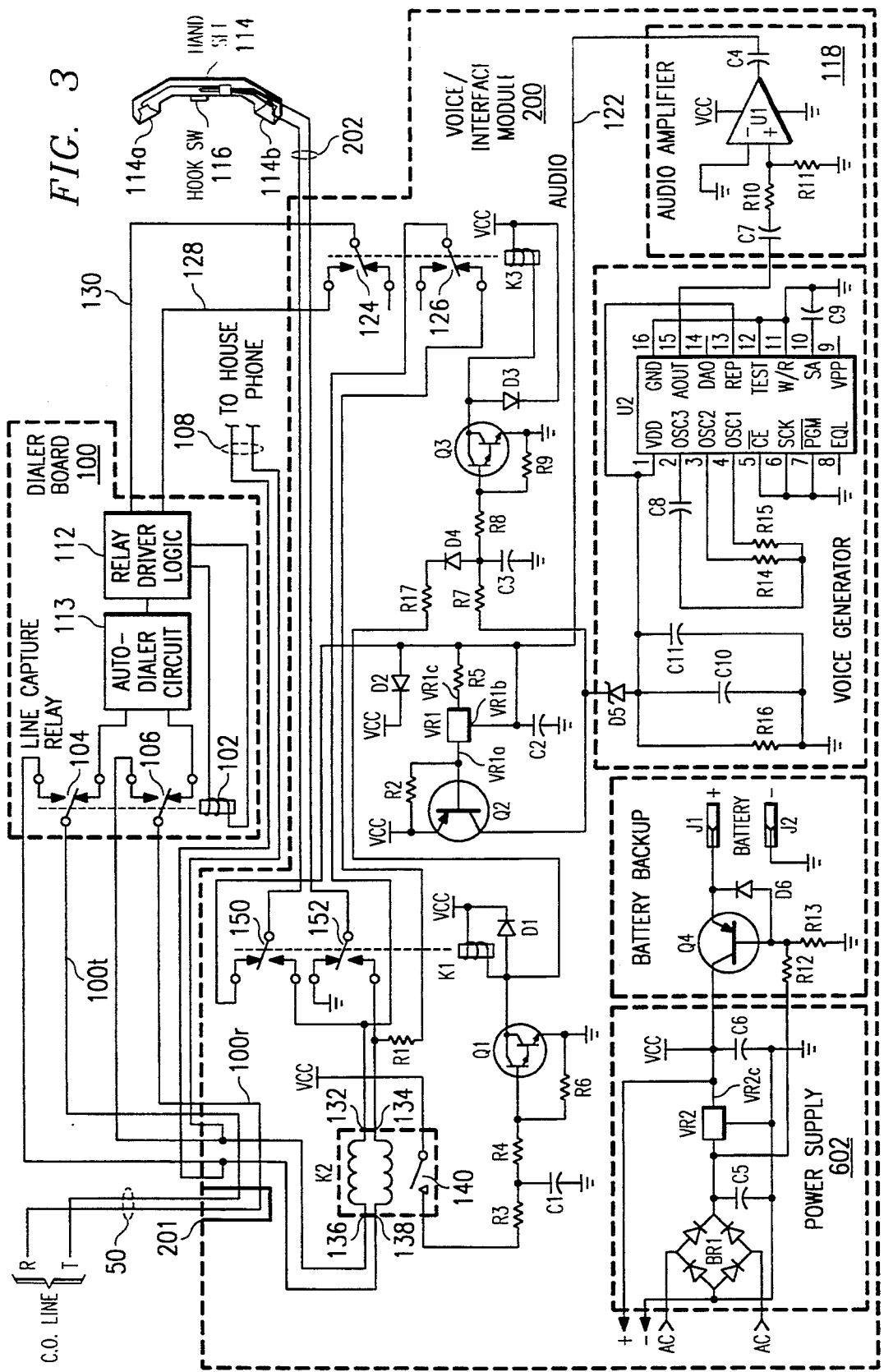
FIG. 3 is a schematic of the circuit seen in FIG. 1, in a "dial" mode state.

Referring now to FIG. 3, as described above, turning on transistor Q3 causes current to flow in relay K3 which causes switches 124 and 126 to change state from the position shown in FIG. 2. When switch 124 changes state, an open circuit is created across terminals 128 and 130 to dialer board 100. The open circuit is interpreted as a trigger by relay driver logic 112 to cause current to flow through relay 102, which causes switches 104 and 106 to change state, disconnecting house phone line 108 from outside telephone line 50 and connecting autodialer circuit 113 to outside telephone line 50. When switch 126 changes states, resistor R1 (for example, a 150 ohm, one watt resistor) is connected across terminals 132 and 134 of relay K2.

Upon connection to telephone line 50, auto-dialer circuit 113 dials a remote station (not shown). When auto-dialer circuit 113 receives an answer from the called remote station, auto-dialer circuit 113 transmits an identification code to the remote station, wherein the identification code represents, for example, an address and elevator designation for handset 114. Upon processing and verification, the remote station sends an acknowledgement signal to auto-dialer circuit 113. Note that auto-dialer circuit 113 is known in the art and can be programmed in a manner known by those skilled in the art to perform the described function.

Figure 4:
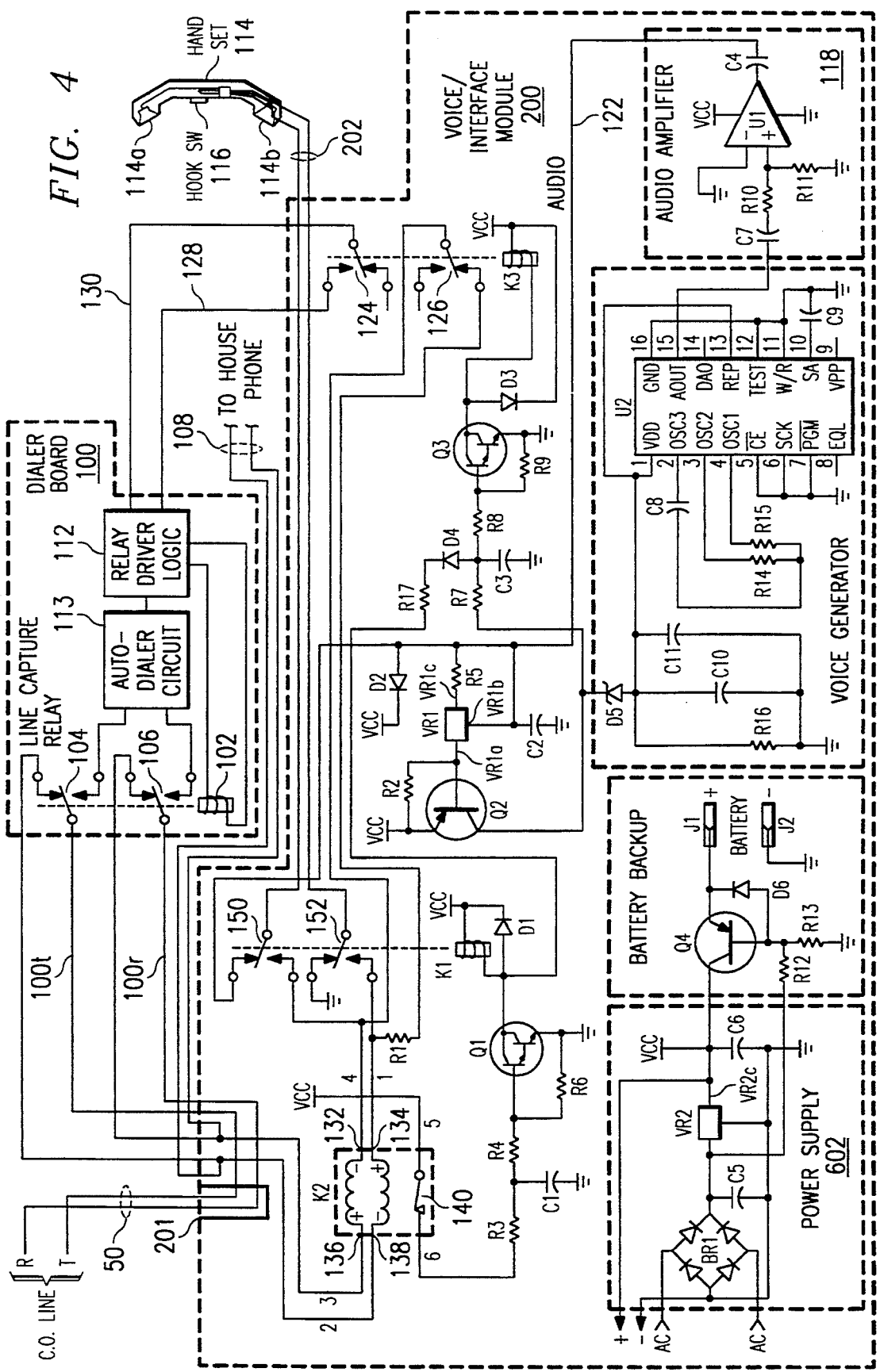
FIG. 4 is a schematic of the circuit shown in FIG. 1, in an "acknowledge" mode state.

Referring now to FIG. 4, upon receipt of the acknowledgement signal, auto-dialer circuit 113 provides relay driver logic 112 with a signal (as will be understood by those of skill in the art), which causes relay driver logic 112 to halt current flow through relay 102, which, in turn, causes switches 104 and 106 to change state to what is shown or opposite to what is shown in FIG. 4. When switches 104 and 106 change state, outside telephone line 50 is connected to house phone line 108 and to terminals 136 and 138 of relay K2. Since terminals 132 and 134 of relay K2 are connected across R1 through the contact closure of switch 126, a connection between outside telephone line 50 (and therefore the remote station) is held, due to current flowing through relay K2, which holds switch 140 closed.

Figure 5:
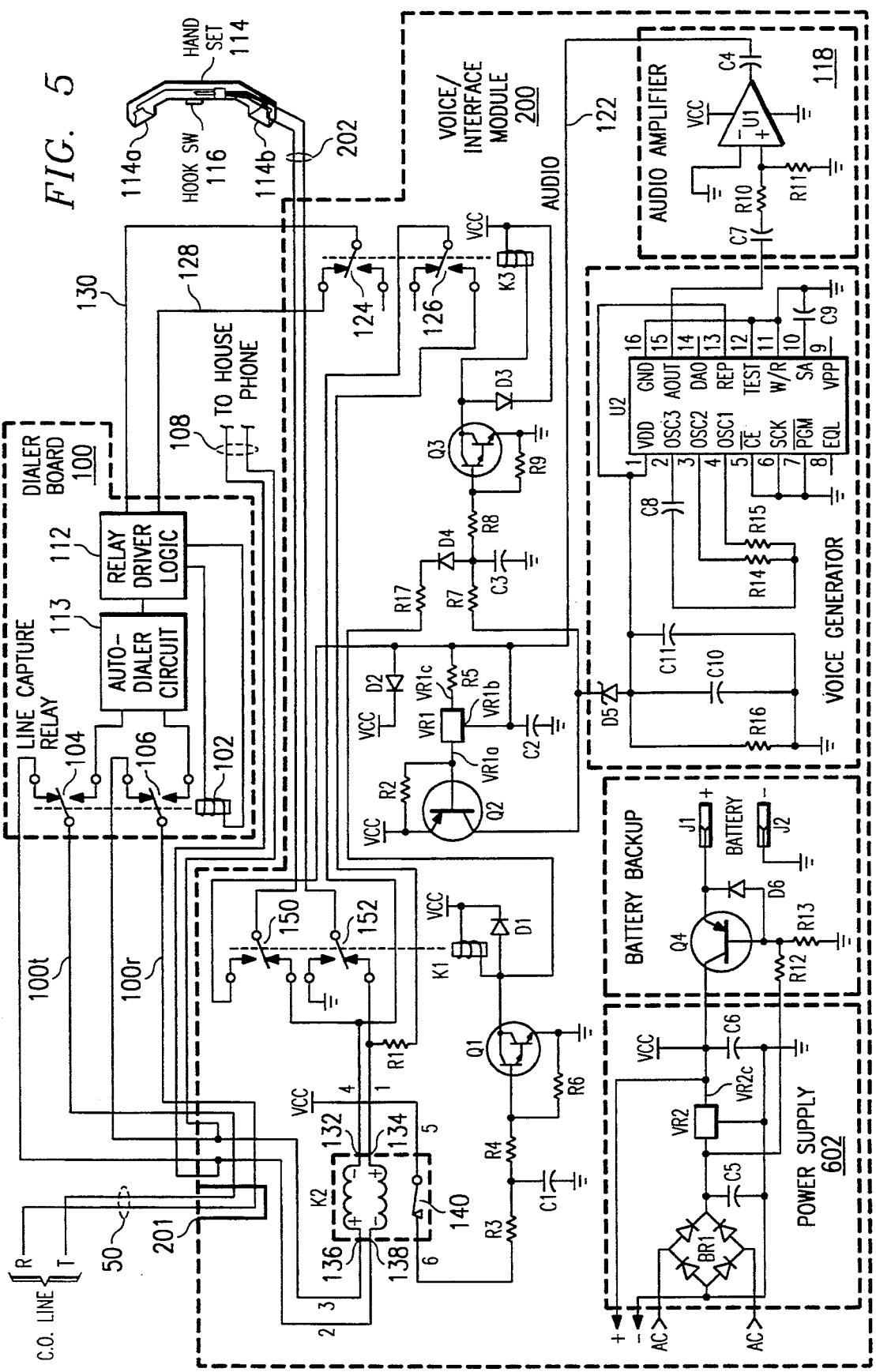
FIG. 5 is a schematic of the circuit of FIG. 1 in a "line connect" mode state.

Referring now to FIG. 5, closing switch 140 turns on Darlington transistor Q1 (for example, a MPSA13), which allows current to flow through relay K1, thus causing switches 150 and 152 to change state. Diode D1 (for example, an 1N4005) is connected in parallel with relay K1 for transient protection. As switches 150 and 152 change state, handset 114 is connected through switches 150 and 152, to terminals 132 and 134 of relay K2, to house phone line 108, and also is connected to outside telephone line 50 through switches 104 and 106. At this point, the user of the handset 114 is able to communicate with the remote station. Meanwhile, current has ceased to flow through voltage regulator VR1 because switch 150 has changed states and transistor Q2 has turned off. Because transistor Q2 has turned off, audio chip U2 is also turned off. Further, when transistor Q1 turns on, the charge on capacitor C3, which had been holding transistor Q3 on, discharges through diode D4 (for example, an 1N4005), through resistor R17, and through transistor Q1. As the charge on capacitor C3 drops, transistor Q3 turns off, and relay K3 deenergizes, causing switches 124 and 126 to return to their original positions, with switch 124 resetting the relay driver logic of dialer board 100 and switch 126 disconnecting resistor R1 from across terminals 132 and 134 of relay K2.

Communication between the user of handset 114 and the remote terminal continues until the user is finished, at which point the user releases the user switch 116 of handset 114. The opening of switch 116 causes current flow through relay K2 to cease, and switch 140 opens. Opening of switch 140 causes capacitor C1 to begin draining its charge through resistors R4 and R6. As the charge on capacitor C1 drops, transistor Q1 turns off. When transistor Q1 turns off, current will cease flowing in relay K1, and switches 150 and 152 will again change state, such that handset 114 is connected to the output of audio amplifier 118 and ground, as originally shown in FIG. 1.

According to a further embodiment of the invention, a remote receiving terminal is provided, which comprises a receiver connected to a telephone line for the purpose or receiving calls from the emergency telephone calling system described previously. Upon receiving a call on the receiver telephone line, the receiver performs the following operations:

answer the call after a predetermined number of rings;

send an answering go-ahead tone signal to the calling dialer;

receive, verify, and store, and verify the dialer identification code;

upon verification of the auto-dialer information, send a received acknowledgement tone signal to the auto-dialer;

transmit the decoded information to a computer screen for display;

connect a repetitive voice audio to the holding line so that the calling party is told that the call has been received at the remote station and will be answered by a "live" operator; and transmit the decoded information to a computer for CRT display and paper printout of the calling telephone's location, advisory backup personnel, emergency response agencies, etc.

Such receivers with connections for ancillary printers, computers and displays are known to those of skill in the art (for example, receivers manufactured by Fire Burglary Instruments of Hauppauge, N.Y., Model CP-220).

According to a further embodiment of the invention, switch 116 of FIGS. 1–5 comprises a spring return "push to activate" switch. Such a switch gives numerous advantages. For example, if a traditional hook switch (which changes states when a handset is lifted from the hook) is used, numerous false or nuisance calls will be made as people in the elevator bump the telephone, or as vandals simply pick up the handset and lay it on the floor.

The embodiment of FIGS. 1–5 also has an advantage in that the remote terminal knows someone has tried to make contact, even if the operator of the handset is unable to speak for some reason (for example, handicapped people or a person who has fainted). Because the auto-dialer 113 sends the remote station an address identifier location code for the particular handset when the user switch 116 has been depressed, and does not release control of outside telephone line 50 until after making the data transmission, it is seen then even if the user of the handset 114 merely toggles user switch 116 only once, the remote station will be contacted and the location given so that someone may be sent to check on the particular elevator where the handset switch was depressed.

According to one embodiment of the invention, as shown in FIG. 1, handset 114 is located in the elevator car, and is connected to voice/interface module 200 via handset lines 202. Handset lines 202 are positioned and arranged in the elevator cable and are conventional telephone lines. Voice/interface module 200 is positioned outside of the elevator car.

Referring again to FIG. 1, the full wave rectified voltage on the output terminal of the bridge rectifier BR1 of Power Supply 602 is connected to an input of Voltage Regulator VR2 (for example, a LM7512CTB). Since terminal 2 of VR2 is connected to ground, voltage regulator VR2 continuously produces a positive 12 volts at terminal VR2c (VCC) for use as a source voltage. Additionally, the VCC voltage is connected to the collector of transistor Q4 (for example, a TIPP32 PNP transistor). The emitter of transistor Q4 is connected to the positive terminal J1 of a standard backup battery. From the voltage divider of resistors R12 and R13, the base of transistor Q4 is kept at a significantly high voltage to keep transistor Q4 turned off. Upon a failure of the power supply, the base voltage of transistor Q4 drops and Q4 is turned on, thereby allowing the battery voltage at terminal J1 to be connected to terminal VCC to supply power for the system.

Diode D6 is placed across the base and the emitter of transistor Q4 as shown to charge the battery.

Voice audio chip U2 is connected to external components as specified by the manufacturer's specifications, as will be understood by those of skill in the art. Likewise, amplifier U1 (FIG. 5) is connected to required external components as specified by the manufacturer in a manner known to those familiar with the art.

Figure 6:
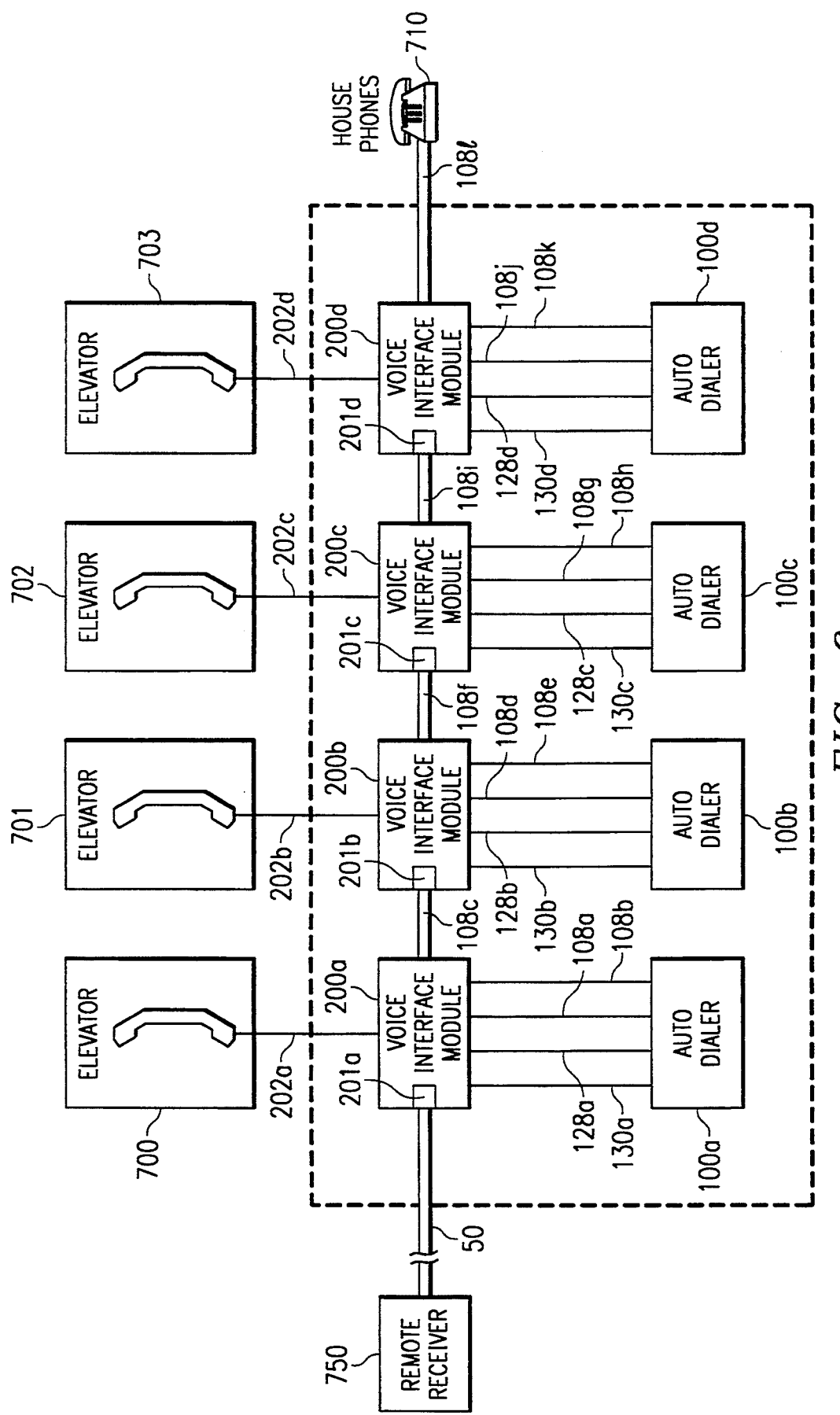
FIG. 6 is a block diagram showing an embodiment of the invention in which multiple elevator telephone lines are connected to a single outside telephone line.

Referring now to FIG. 6, an embodiment of the invention is shown in which multiple elevators 700–703 are connected to a single outside telephone line 50 (which, in turn, connects elevators 700–703 to remote terminal 750) via voice/interface modules 200a–200d and corresponding dialer boards 100a–100d. It is noted that a single dialer board can be used to provide the dialing functions for elevators 700–703. Voice/interface modules 200a–200d and dialer boards 100a–100d are located outside of elevators 700–703, for example, in a central switching room.

As shown on FIG. 6, voice/interface module 200a is connected to phone line 50 at telephone line input 201a, and each of the other voice/interface modules 200b–200d are connected to the house phone connection for the preceding voice/interface module (connectors 108c, 108f, and 108i) via telephone line inputs 201b–201d. Specifically, outside telephone line 50 from remote station 750, is connected to the input of module 200a, then to auto-dialer 100a through line 108a, and then returns to voice/interface module 200a through line 108b, where module 200a then provides the output of voice/interface module 200a, as line 108c, to the input of voice/interface module 200b. Line 108c then continues through voice/interface module 200b to auto-dialer 100b through line 108d and then returns to voice/interface module 200b through 108e, where it then provides the output of voice/interface module 200b, as line 108f to the input of voice/interface module 200c. As shown in FIG. 6, the interconnection of voice/interface modules 200c and 200d to auto-dialers 200c and 100d are made similarly to that described for modules 200a and 200b through lines 108g–108k with the output of voice/interface module 200d, line 108L, being connected as shown to the normal use house phone serving the premises, thus allowing four elevator telephones to be connected to one outside telephone line 50. Again referring to FIG. 6, as shown, the initiating trigger signal for auto-dialers 100a–100d from voice/interface modules 200a–200d is carried by paired conductors 128a and 130a, 128b and 130b, 128c and 130c, and 128d and 130d. It will be noted that as long as none of the hook switches exemplified by user switch 116 of handset 114 are depressed (closed), outside telephone lines 50 will be connected to normal use telephone 710; therefore, no dedicated phone line is needed for any elevators 700–703.

It will be noted that according to the embodiment of FIG. 6, none of elevator handset lines 202a–202d are connected to phone lines 50, unless a caller has activated one of handsets 114a–114d. Further, none of lines 202a–202d are connected together as they are in certain prior art systems. By leaving lines 202a–202d disconnected from each other and from lines 50 when handsets 114a–114d are not in use, there is no induced noise from the elevator cables on the normal use line 50 that is connected to telephone instrument 710.

A large component of the noise that is present on elevator phone lines occurs because there is an induced electrical connection between the phone line in use, and an operating elevator. For example, if elevators 700–702 are operating, and elevator 703 is broken or stuck between floors or will not operate properly, an operator using handset 114d will not hear switching noise from elevators 700–702, because when in operation, handset 114d, handset lines 202d, dialer board 100d, and voice/interface module 200d are disconnected from any of the component parts of the systems associated with elevators 700–702. In this example, since elevator 703 is inoperative, the induced noise on line 202d will be minimal and not affected by lines 202a–202c, allowing clear communication between the caller in elevator 703 and the remote station.

In one embodiment of the system an illuminating Light Emitting Diode (hereafter LED, normal color "red") is mounted on the base of the resting hook for handset 114, and is connected to the handset cable in such a manner than when user switch 116 is pressed to initiate a call, the LED will illuminate with a bright (red) glow indicating that a call has been initiated and the unit has been activated to call the remote station. Those of skill in the art will know of mounting techniques and circuitry for connection of the LED indicator to the handset. For the deaf or extremely hard of hearing, this indicator will signify that the unit has been activated and that "help is on the way."

In another embodiment of the system, handset 116 is made "hearing aid compatible" or "voice amplified," terms that those that are skilled in the art will be proficient in applying.

In yet another embodiment of the system, a second LED (color green) is mounted on the face of the resting hook of handset 114 and connected to the handset cable in such a manner than when the system has been connected to an active outside telephone line, such as shown in FIGS. 1–6, as outside line 50, the LED will constantly illuminate with a bright (green) glow, indicating that the telephone station has proper connection to the outside service telephone line. Should the connection of the telephone station to the outside line become disconnected or defective, the LED will be extinguished. Those of skill in the art will know of mounting techniques and circuitry for connection of such an LED indicator.

To the potential or emergency situation user of the telephone call station, illumination of the line LED indicator assures the potential user that a good outside line is properly connected and active for use when needed for emergency calling.

The above embodiments are given by way of example only, and are not intended as a limitation on the scope of the invention, as those of skill in the art will perceive other embodiments which do not depart from the spirit of the invention.

What is claimed is:

1. A process for connecting a speaker and microphone pair to a remote terminal over a telecommunications channel through a multi-user telecommunication system, the telecommunications channel having a telephone normally connected thereto, the process comprising the steps of:

activating an initiation signal at the speaker and microphone pair;

disconnecting the telephone from the telecommunications channel responsive to the initiation signal;

sending a remote terminal signal to the multi-user telecommunication system with communication circuitry responsive to the initiation signal;

providing an audio signal with voice interface circuitry through the speaker during said sending step;

receiving an answer signal from the multi-user telecommunication system with the communication circuitry signifying that the remote terminal is contacted by the multi-user telecommunication system;

sending an identification code associated with the speaker and microphone pair with the communication circuitry across the multi-user telecommunication system to the remote terminal;

receiving an acknowledgment signal from the remote terminal with the communication circuitry indicating the remote terminal has received the identification code; and connecting the speaker and microphone pair to the remote terminal by the telecommunications channel and through the multi-user telecommunications system.

2. The process of claim 1 wherein said connecting step occurs after said receiving of the acknowledgment signal step.

3. The process of claim 1 wherein said connecting step further comprises switching the telecommunications channel into operable connection with the speaker and microphone pair.

4. The process of claim 1 wherein said connecting step occurs after said receiving of the acknowledgment signal Step, and wherein said connecting step further comprises switching the telecommunications channel into operable connection with the speaker and microphone pair.

5. A process for providing telecommunications service on a telephone line between a remote terminal and multiple speaker and microphone pairs, the telephone line having a telephone normally connected thereto, the process comprising the steps of:

activating an initiation signal from an initiating speaker and microphone pair signifying use of the speaker and microphone pair;

providing an audio signal through the speaker of the initiating speaker and microphone pair with voice interface circuitry during said activating step;

disconnecting the telephone from the telephone line during said activating step;

contacting the remote terminal via the telephone line responsive to the initiation signal by dialing with communication circuitry a telephone number for the remote terminal on the telephone line, the telephone number for the remote terminal being stored in a storage means remote from the initiating speaker and microphone pair; and connecting the initiating speaker and microphone pair to the telephone line so as to provide telecommunications service between the remote terminal and the initiating speaker and microphone pair.

6. The process of claim 5 further comprising the step of:

sending with the communication circuitry the remote terminal an identification code associated with the initiating speaker and microphone pair.

7. The process of claim 6 further comprising the step of:

receiving with the communication circuitry an acknowledgment signal from the remote terminal indicating that the remote terminal has received the identification code before said connecting step.

8. The process of claim 5 further comprising the steps of:

disconnecting the initiating speaker and microphone pair from the telephone line upon receipt of a disconnect signal from the remote terminal; and reconnecting the telephone to the telephone line between said contacting and connecting steps.

9. The process of claim 5 further comprising the steps of:

sending with communication circuitry the remote terminal an identification code associated with the initiating speaker and microphone pair;

receiving with communication circuitry an acknowledgment signal from the remote terminal indicating that the remote terminal has received the identification code before said connecting step;

disconnecting the initiating speaker and microphone pair from the telephone line upon receipt of a disconnect signal from the remote terminal; and reconnecting the telephone to the telephone line between said contacting and connecting steps.

10. A system for connecting a speaker and microphone pair to a remote terminal over a telecommunications channel through a multi-user telecommunication system, the telecommunications channel having a telephone normally connected thereto, the system comprising:

means for activating an initiation signal at the speaker and microphone pair;

means for disconnecting the telephone from the telecommunications channel responsive to the initiation signal;

communication circuitry for sending a remote terminal signal to the multi-user telecommunication system responsive to the initiation signal;

voice interface circuitry for providing an audio signal through the speaker during sending of the remote terminal signal;

wherein the communication circuitry is further operable to receive an answer signal from the multi-user telecommunication system signifying that the remote terminal is contacted by the multi-user telecommunication system, to send an identification code associated with the speaker and microphone pair across the multi-user telecommunication system to the remote terminal, and to receive an acknowledgment signal from the remote terminal that the remote terminal has received the identification code; and means for connecting the speaker and microphone pair to the remote terminal through the multi-user telecommunications system.

11. The system of claim 10, wherein said means for connecting is responsive to the receipt of the acknowledgment signal.

12. The system of claim 10 wherein said means for connecting further comprises means for switching the telecommunications channel into operable connection with the speaker and microphone pair.

13. The system of claim 10, wherein said means for connecting the speaker and microphone pair to the remote terminal is responsive to the receipt of the acknowledgment signal, and further comprises means for switching the telecommunications channel into operable connection with the speaker and microphone pair, and means for disconnecting the telephone from the telecommunications channel responsive to said activating means and while said sending means sends the remote terminal signal.

14. A system for providing telecommunications service on a telephone line between a remote terminal and multiple speaker and microphone pairs, the telephone line having a telephone normally connected thereto, comprising:
    means for activating an initiation signal from an initiating speaker and microphone pair signifying use of the speaker and microphone pair;
    means for disconnecting the telephone from the telephone line upon receipt of the initiation signal;
    communication circuitry for contacting the remote terminal via the telephone line responsive to the initiation signal;
    voice interface circuitry for providing an audio signal through the speaker of the initiating speaker and microphone pair while the communication circuitry contacts the remote terminal; and
    means for connecting the initiating speaker and microphone pair to the telephone line so as to provide telecommunications service between the remote terminal and the initiating speaker and microphone pair, 15. The system of claim 14 wherein the communication circuitry is further operable to send the remote terminal an identification code associated with the initiating speaker and microphone pair.

16. The system of claim 14 wherein the communication circuitry is further operable to receive an acknowledgment signal from the remote terminal indicating that the remote terminal has received the identification code, 17. The system of claim 14 further comprising:
    means for disconnecting the initiating speaker and microphone pair from the telephone line upon receipt of a disconnect signal; and
    means for reconnecting the telephone to the telephone line after the communication circuitry contacts the remote terminal, 18. The system of claim 14 wherein the communication circuitry is further operable to send the remote terminal an identification code associated with the initiating speaker and microphone pair and to receive an acknowledgment signal from the remote terminal indicating the remote terminal has received the identification code, the system further comprising:
    means for disconnecting the initiating speaker and microphone pair from the telephone line upon receipt of a disconnect signal; and
    means for reconnecting the telephone to the telephone line after the communication circuitry contacts the remote terminal.

19. A telecommunication system for connecting multiple elevators to a remote terminal with a single telephone line having a telephone normally coupled thereto, the system comprising:
    a first speaker and microphone pair located in a first elevator;
    a first elevator switch having two states;
    a first pair of signal lines connected to the first speaker and microphone pair, wherein the first pair of signal lines is included in a trailing cable for the first elevator;
    a second speaker and microphone pair located in a second elevator;
    a second elevator switch having two states;
    a second pair of signal lines connected to the second speaker and microphone pair, wherein the second pair of signal lines is included in a trailing cable for the second elevator;
    a first means for connecting the first pair of signal lines to the telephone line responsive to the first elevator switch changing states, the first means for connecting being located outside of the first elevator;
    a second means for connecting the second pair of signal lines to the telephone line responsive to the second elevator switch changing states, the second means for connecting being located outside of the first elevator; and
    a first means for disconnecting the telephone from the telephone line responsive to one of the first and second elevator switches changing states.

20. The multiple elevator telecommunication system of claim 19 further comprising:
    communication circuitry for generating an initiation signal indicating the use of one of the first and second speaker and microphone pairs responsive to one of the first and second elevator switches changing states; and
    wherein the communication circuitry is further operable to dial a telephone number associated with the remote terminal responsive to the initiation signal.

21. A process for connecting multiple elevator speaker and microphone pairs to a remote terminal via a standard telephone channel, the standard telephone channel having a telephone normally connected thereto, the process comprising the steps of:
    activating a speaker and microphone pair in-use signal from within one of the elevators;
    disconnecting the telephone from the telephone channel responsive to the in-use signal;
    dialing with communication circuitry, a telephone number for the remote terminal on the standard telephone channel wherein said dialing is responsive to said activating the in-use signal step;
    preventing with the communication circuitry the remaining elevator speaker and microphone pairs from connecting to the standard telephone channel responsive to said activating step and during said dialing step; and
    connecting the in-use speaker and microphone pair to the standard telephone channel after said dialing step.

22. The process of claim 21 further comprising the step of:
    preventing the in-use speaker and microphone pair from connecting to the standard telephone channel with the communication circuitry during said dialing step.

23. The process of claim 21 further comprising the step of:

providing a voice audio signal to the in-use speaker and microphone pair with voice interface circuitry for a portion of time of said dialing step.

24. The process of claim 23 further comprising the step of:
preventing the in-use speaker and microphone pair from connecting to the standard telephone channel with the communication circuitry during said dialing step.

25. The process of claim 21 wherein said activating the speaker and microphone pair in-use signal step is in response to a switch changing states in the elevator.

26. The process of claim 25 further comprising connecting the speaker of the in-use speaker and microphone pair to voice interface circuitry responsive to the in-use signal.

27. The process of claim 26 further comprising the step of:
providing a voice audio signal to the in-use speaker and microphone pair with voice interface circuitry for a portion of said dialing step.

28. The process of claim 27 further comprising the steps of:
preventing the speaker and microphone pair of the in-use speaker and microphone pair from connecting to the standard telephone channel with the communication circuitry during said dialing step.

29. A system for connecting multiple elevator speaker and microphone pairs to a remote terminal via a standard telephone channel, the standard telephone line having a telephone normally connected thereto, the system comprising:
generating means for generating an in-use signal from within one of the elevators indicating the use of the speaker and microphone pair in the elevator;
disconnecting means for disconnecting the telephone from the standard telephone line responsive to the in-use signal;
communication circuitry responsive to said generating means for dialing a telephone number associated with the remote terminal on the standard telephone channel so as to contact the remote terminal;
first isolating means for isolating all remaining speaker and microphone pairs from the standard telephone channel;
first connecting means for connecting the in-use speaker and microphone pair to the standard telephone channel so as to connect the in-use speaker and microphone pair to the remote terminal.

30. The system of claim 29 further comprising:
second isolating means for isolating the in-use speaker and microphone pair from the standard telephone channel while said dialing means is dialing.

31. The system of claim 29 further comprising:
voice interface circuitry for providing a voice audio signal to the in-use speaker and microphone pair while the communication circuitry is dialing.

32. The system of claim 31 further comprising:
second isolating means for isolating the in-use speaker and microphone pair from the standard telephone channel while the communication circuitry is dialing.

33. The system of claim 29 wherein said generating means further comprises a switch having at least two states, the switch is operably connected to said dialing means, wherein said dialing means, is responsive to a change of state of the switch.

34. The system of claim 31 wherein the voice interface circuitry further comprises a second connecting means responsive to the in-use signal for connecting the speaker of the in-use speaker and microphone pair to the voice interface circuitry.

35. The system of claim 34 wherein the voice audio signal is provided to the in-use speaker and microphone pair for a portion of the time required by the communication circuitry to dial the telephone number of the remote station.

36. The system of claim 35 further comprising:
second isolating means for isolating the in-use speaker and microphone pair from the standard telephone channel during the time required by the communication circuitry to dial the telephone number of the remote station.

37. The system of claim 14 further comprising a plurality of communication circuitry each associated with one of the speaker and microphone pairs.

38. The system of claim 20 wherein the communication circuitry further comprises a plurality of communications circuitry each associated with one of the first and second speaker and microphone pairs and each operable to dial the telephone number associated with the remote terminal for each elevator.

39. The system of claim 29 wherein the communication circuitry further comprises a plurality of communication circuitry each associated with one of the speaker and microphone pairs.

* * * * *